United States Patent [19]

Isaacs

[11] 4,022,413
[45] May 10, 1977

[54] WHEELED SUPPORT AND TRANSPORT PLATFORM

[76] Inventor: Harold Isaacs, 2567 Lafayette Drive, University Heights, Ohio 44118

[22] Filed: Mar. 25, 1976

[21] Appl. No.: 670,348

[52] U.S. Cl. .................................. 248/23; 248/129; 280/47.34
[51] Int. Cl.² .................. F16M 3/00; F16M 11/04
[58] Field of Search ........... 248/23, 172, 173, 129, 248/346; 214/380, 330; 280/47.34, 47.35, 47.36, 47.37

[56] References Cited

UNITED STATES PATENTS

| | | | |
|---|---|---|---|
| 1,150,082 | 8/1915 | Verplanck | 280/47.34 |
| 1,813,045 | 7/1931 | Franks | 248/23 |
| 2,311,422 | 2/1943 | Walling | 280/47.34 |
| 2,624,483 | 1/1953 | Ketzel | 248/129 X |
| 2,664,307 | 12/1953 | Wieland | 248/172 X |
| 3,313,378 | 4/1967 | Freeman et al. | 280/47.34 X |
| 3,759,538 | 9/1973 | Fabiano | 280/47.37 X |
| 3,874,531 | 4/1975 | Mayo | 280/47.35 X |

FOREIGN PATENTS OR APPLICATIONS

| | | | |
|---|---|---|---|
| 965,743 | 9/1950 | France | 280/47.34 |
| 526,885 | 10/1921 | France | 280/47.34 |
| 317,031 | 8/1916 | Germany | 280/47.35 |

*Primary Examiner*—J. Franklin Foss
*Attorney, Agent, or Firm*—Edward E. Sachs

[57] ABSTRACT

A generally rectangular wheeled support and transport platform for electric welder power units or the like includes adjustable holding means for holding an electric welder power unit against sliding movement relative to the platform. Upright members extending upwardly from the periphery of the platform in spaced-apart relationship include electric cable storage means for storing input, electrode and ground cables.

12 Claims, 9 Drawing Figures

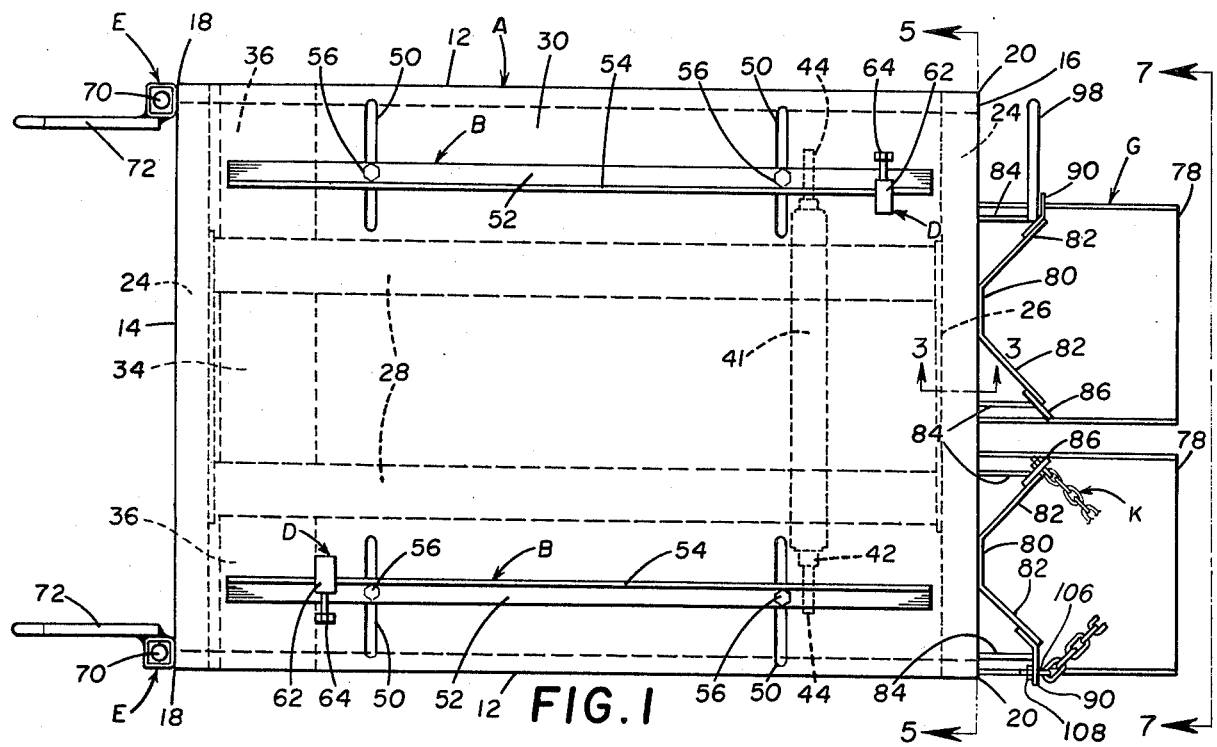
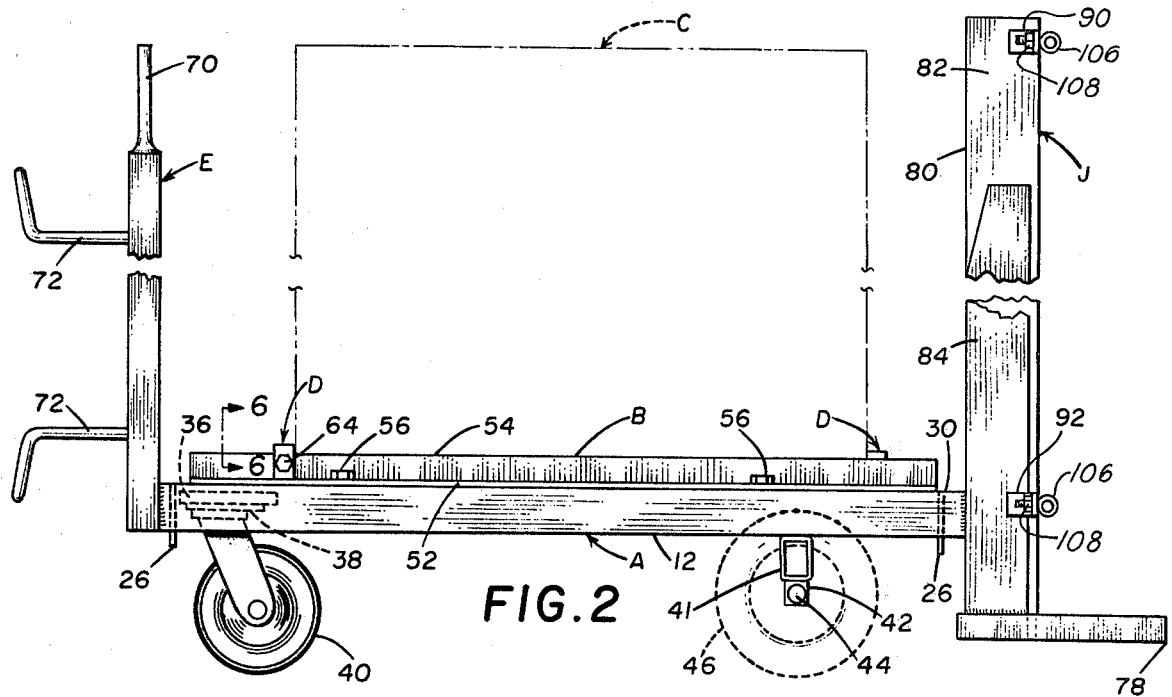
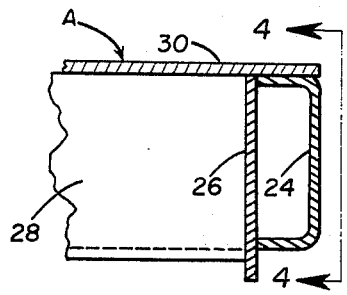
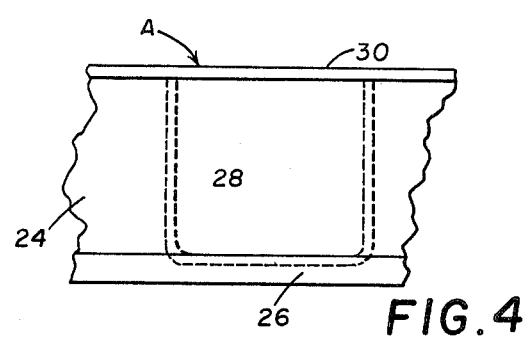
FIG.1
FIG.2
FIG.3
FIG.4

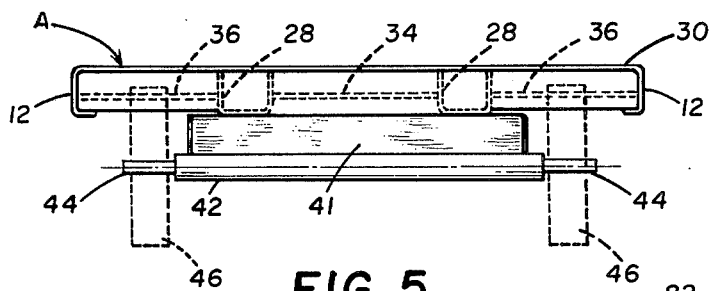
FIG.5
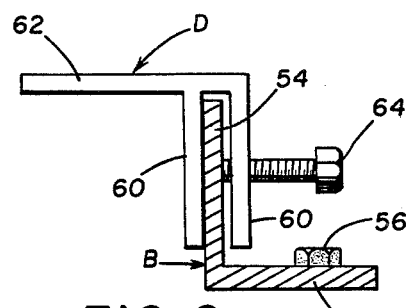
FIG.6
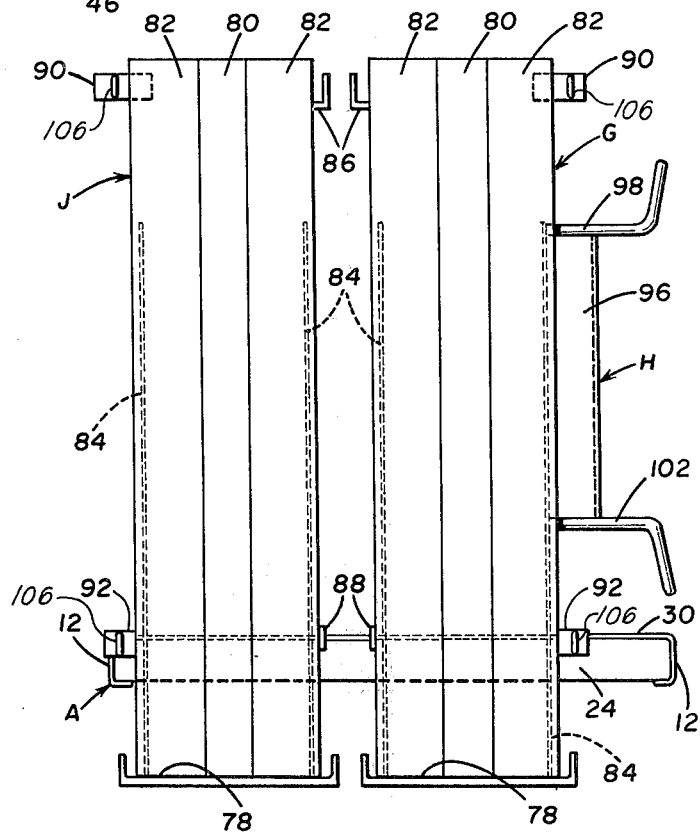
FIG.7
FIG.8
FIG.9

WHEELED SUPPORT AND TRANSPORT PLATFORM

The invention relates generally to a wheeled support and transport platform and, more particularly, to such a support and transport platform for use with electric welders or the like. The support and transport platform of the present application provides a systematized approach to mobile welders.

Mobile welders commonly include electric welding apparatus supported on a cart defined by a wheeled support and transport platform. There are essentially two types of mobile electric welders. A first type is generally known as a stick welder and uses consumable electrodes in the form of metal rods having a chemical coating thereon. Another type is generally known as an M. I. G. welder, commonly referred to as a mig welder, wherein an uncoated wire is fed semi-automatically to the area where welding is taking place, and carbon dioxide is dispensed toward the arc for keeping atmosphere away therefrom.

In mobile electric welders of the type described, there are three separate electrical cables defined by the power input cable, the electrode cable and the ground cable. These cables are quite long, and often interfere with welding operations, or with other work going on in a particular area, if left lying around randomly. Electrical cables lying all over the floor of an area are frequently run over by other vehicles and otherwise interfere with orderly operations. It would be desirable to have a convenient arrangement for storing the electrical cables and the lengths thereof not being used at any particular time.

Mobile electric welders of the type described require different types of accessories on the support and transport platform. With a stick welder, it is only necessary to have a pair of upright handle members at the front of the platform, and a single upright member adjacent the rear of the platform. All of the upright members have electrical cable storage means thereon. With a mig welder, it is necessary to carry a large cylinder of carbon dioxide on the platform. For certain operations, an additional gas cylinder for containing argon or the like may be desired on the platform. In other arrangements, it may be desired to have facilities for supporting a pair of carbon dioxide cylinders so that a spare is always available.

Various types of welder electric power units come in different sizes and shapes, and it is necessary that the power unit be securely held on the platform against sliding movement relative thereto. With arrangements of the type described, it is necessary for a dealer to stock a large number of different platforms if all of the components are assembled at the factory. It would be desirable to have a systematized approach to mobile electric welders so that a dealer could have a basic wheeled support and transport platform on hand, and add the desired accessories requested by a particular customer.

It is therefore the primary object of the present invention to provide a wheeled support and transport and transport platform for electric welders or the like which is easily converted to a particular customer's needs by adding accessories thereto.

It is a further object of the present invention to provide a wheeled support and transport platform having storage means thereon for a plurality of separate electric cables attached to an electric welder power unit or the like.

It is another object of the present invention to provide a wheeled support and transport platform having adjustable holding means thereon for holding an electric welder power unit against sliding movement relative to the platform.

It is also an object of the invention to provide a wheeled support and transport platform having simplified supporting and carrying arrangements for gas cylinders.

An aspect of the present invention resides in a generally rectangular wheeled support and transport platform having front and rear ends, opposite sides and an upper surface for supporting a welder power unit or the like thereon. Adjustable holding means on the platform extends above the upper surface thereof for adjustably holding a welder power unit against sliding movement relative to the platform. The adjustable holding means is adjustable in a first direction across the opposite sides, and in a second direction across the front and rear ends. A plurality of spaced-apart upright members secured to the periphery of the platform have electric cable storage means thereon for storing electric power input, electrode and ground cables.

In one arrangement, the adjustable holding means includes a plurality of spaced-apart elongated slots through the platform. Angle irons define holding members which are releasably clamped against the upper surface of the platform by clamping means extending through the slots and angle irons. Loosening of the clamping means allows adjustment of the holding members in a first direction extending across the opposite sides of the platform. The holding members may have holding brackets adjustably secured thereto for selective movement in a direction across the front and rear ends of the platform. With this arrangement, the holding members are firmly positionable against the opposite sides of a welder power unit resting on the platform, while the holding brackets are firmly positionable against the front and rear ends of the power unit.

The upright members having electric cable storage means thereon preferably include a pair of upright members secured to the front end of the platform. A third upright member may be secured to the periphery of the platform adjacent the rear end thereof when a stick welder is supported on the platform.

In the alternative, the third upright member may be in the form of a gas cylinder carrier secured to the rear end of the platform and having a generally horizontal bottom support extending away from the platform, and spaced substantially below the upper surface of the platform. This places the horizontal bottom support closely adjacent the floor or other surface on which the platform rests so that a gas cylinder can easily be positioned on the bottom support simply by tilting the cylinder and rocking same onto the bottom support of the carrier. The gas cylinder carrier has an upright portion with the electric cable storage means secured to one side thereof. Adjustable strap means on the gas cylinder carrier is provided for securely strapping a gas cylinder to the carrier against accidental displacement therefrom. Where a spare or additional gas cylinder is desired on the platform, a pair of gas cylinder carriers are secured to the rear end of the platform in side-by-side relationship.

For the better understanding of the present invention, together with other and further objects thereof, reference is had to the following description taken in connection with the accompanying drawings, and its scope will be pointed out in the appended claims.

In the drawing:

FIG. 1 is a top plan view of a wheeled support and transport platform;

FIG. 2 is a side elevational view of the platform of FIG. 1;

FIG. 3 is a cross-sectional elevational view taken generally on line 3—3 of FIG. 1;

FIG. 4 is an elevational view taken generally on line 4—4 of FIG. 3;

FIG. 5 is an elevational front view taken generally on line 5—5 of FIG. 1;

FIG. 6 is a partial cross-sectional elevational view taken generally on line 6—6 of FIG. 2;

FIG. 7 is a front elevational view taken generally on line 7—7 of FIG. 1;

FIG. 8 is an elevational view of an upright member or post usable with the support and transport and platform of FIG. 1; and FIG. 9 is a top plan view taken generally on line 9—9 of FIG. 8.

Referring now to the drawing, and particularly FIG. 1, there is shown a generally rectangular wheeled support and transport platform A having an outer periphery defined by opposite sides 12, and front and rear ends 14 and 16. The front end 14 intersects the sides 12 at front corners 18, while the rear end 16 intersects the sides 12 at rear corners 20.

The platform A has generally U-shaped channels 24 at the front and rear ends thereof as best shown in FIG. 3. The channels 24 are positioned with their bases extending vertically, and with the legs of the channels at the front and rear ends of the platform extending toward one another. A plate 26 is welded to the terminal ends of the legs on each of the channels 24. A pair of transversely spaced-apart longitudinally extending generally U-shaped channels 28 are welded between the plates 26 at the front and rear ends of the platform A. The channels 28 are positioned with their bases extending horizontally, and with their legs extending upwardly. A sheet metal member 30 provides an upper surface for the platform A, and is welded to the channels 24 and 28, and the plates 26. The side edge portions of the sheet metal member 30 are bent downwardly as shown in FIG. 5 and then are bent inwardly beneath the end channels 24. This manner of bending the side portions of the sheet metal member 30 provides a generally U-shaped integral channel construction extending along the sides of the platform A. The bent portions are welded to the channels 24.

As best shown in FIGS. 1 and 5, a plate member 34 is welded between the channels 28 adjacent the front end 14 intermediate the upper and lower surfaces of the platform A. The plate 34 has suitable holes therethrough for attaching a conventional foot operated brake to the platform A. Such a brake of a known type includes a foot operated lever or pedal which is selectively operated for engaging a brake member with the surface on which the platform A is supported. Additional plates 36 are welded between the channels 28 and the bent side portions of the sheet metal member 30 at the opposite sides 12. The plates 36 have suitable holes therein for mounting swivel caster assemblies thereon as shown generally at 38 in FIG. 2, and having wheels 40 rotatably mounted thereon. A hollow rectangular member 41 is welded across the channels 28 adjacent the rear end of the platform A. A bar 42 is in turn welded to the underside of the member 41, and has cylindrical ends 44 rotatably receiving wheels 46.

Spaced-apart elongated slots 50 are formed through the platform A as best shown in FIG. 1. At least a pair of the slots 50 are provided adjacent each platform side 12, and such slots are elongated in a direction extending across the opposite platform sides 12. The slots 50 define part of an adjustable holding means for holding a welder electric power unit or the like on the platform A against sliding movement relative thereto.

The holding means includes holding members B in the form of elongated angle irons having first legs 52 positioned against the upper surface of the platform A, and second legs 54 extending upwardly therefrom. The first legs 52 extend toward the platform sides 12 from the second legs 54. Clamping means in the form of nut and bolt assemblies 56 extend through suitable holes in the first legs 52 of the angle irons B and through the slots 50 for adjustably clamping the angle irons B against the upper surface of the platform A. Loosening of the clamping means 56 allows movement of the holding members B in a first direction extending across opposite platform sides 12 so that the second legs 54 can be positioned in abutting relationship with the opposite bottom side portions of a power unit supported on the platform A and schematically represented at C in FIG. 2. The adjustable holding means for holding the power unit also includes holding brackets D shown in FIGS. 1, 2 and 6. The holding brackets D include spaced-apart downwardly extending legs 60 defining a downwardly opening space receiving leg 54 on angle iron B. Each of the holding brackets D includes an inwardly extending abutment portion 62. A bolt 64 threaded through a tapped hole in one leg 60 has its inner end bearing against the outer surface of the leg 54 to define a releasable securing means for releasably securing the holding brackets D against sliding movement along the upright legs 54 of angle irons B. The clamping means defined by the nut and bolt assemblies 56, and the securing means defined by the bolts 64, are loosened for positioning members B adjacent platform sides 12 and the holding brackets D adjacent ends 14 and 16 to place a welder electric power unit on the platform A. Once the power unit is properly positioned, the holding members B are moved inwardly toward one another until they abut the opposite bottom sides of the power unit. The nut and bolt assemblies 56 are then tightened for clamping the holding members B against the upper surface of the platform A. The holding brackets 62 are also moved along the legs 54 until one bracket abuts a front end of the power unit, while the other bracket abuts the rear end of the power unit. The bolts 64 are then tightened so that their inner ends bear against the legs 54 to releasably secure the holding brackets D against movement. This securely holds the power unit in position on the platform A against sliding movement relative thereto in any direction. The adjustable holding means is adjustable in a first direction across the platform sides 12 by adjustable movement of the holding members B. The holding means is also adjustable in a second direction across the platform ends 14 and 16 by adjustable movement of the holding brackets D along the holding members B.

Upright members in the form of rectangular hollow posts E are welded to the base of the channel 24 at the front platform end 14. The posts E are preferably welded to the periphery of the platform adjacent the front corners 18. Therefore, it is possible to weld or otherwise secure the posts E to the sides 12. However, the most desirable and preferred arrangement has the posts E secured to the front end 14 as shown. The outer surfaces of the posts E extend substantially flush with the opposite sides 12. Round handle portion 70 are welded to the upper ends of the posts E. The round handle portions 70 may be coated or covered with plastic or rubber and are graspible by a person for manipulating the platform A to position the welder in a desired location. Electric cable storage means is provided on each post E. In one arrangement, the electric cable storage means comprises generally L-shaped bracket members including an upwardly opening bracket member 72 and a downwardly opening bracket member 74. An electric cable is coilable upon the upper and lower bracket members 72 and 74 on each post. Generally, the electrode and ground cables will be stored on the cable storage means provided on the front posts E, and the power input cable will be stored on a third upright member generally opposite from posts E. The brackets 72 and 74 are preferably welded to the inner sides of the posts E so they are spaced inwardly from the sides 12. In addition, the brackets 72 and 74 extend outwardly away from the platform A in the second direction defined across the platform ends 14 and 16. This provides adequate room beyond the platform A for storing the power input, electrode and ground cables attached to the welder power unit carried by the platform A.

At least one additional upright member is normally secured to the platform A generally opposite from the upright members E. In one arrangement, a gas cylinder carrier may be attached to the platform A, and one such carrier is indicated generally at G. The gas cylinder carrier G includes a generally horizontal bottom support portion 78 and a generally V-shaped upright cylinder supporting portion having a small flat base portion 80, and opposite diverging leg portions 82. The bottoms of portions 80 and 82 are welded to the horizontal support portion 78. Stiffening plates 84 are welded to the rear surfaces of the legs 82 adjacent the outer ends thereof and to the support portion 78 for stiffening and strengthening the carrier G. The stiffening plates 84 extend from support portion 78 somewhat less than the full height of the leg portions 82 as best shown in FIG. 7. A generally L-shaped upper hook member 86 is welded to one leg portion 82 adjacent the upper rear end thereof, and a lower generally L-shaped hook 88 is welded to one of stiffening plates 84 closer to support portion 78. An upper bracket 90 is welded to a leg 82 opposite from the hook 86, and another bracket 92 is welded to the other stiffening plate 84 opposite from lower hook 88. Each of the brackets 90 and 92 has a suitable hole therethrough for receiving a threaded bolt. A cable storage means mounted on the gas cylinder carrier G includes a channel member 96 having an upwardly opening generally L-shaped upper bracket 98 welded to the upper end thereof, and a downwardly opening generally L-shaped bracket 102 welded to the bottom end thereof. One leg or side of the channel 96 is welded to one of the stiffening plates 84 on carrier G. The channel 96 with the brackets 98 and 102 welded thereto defines a unitary storage means H which can be stocked separately and welded to a gas cylinder carrier when so desired. The gas cylinder carrier G is welded to the base of the channel 24 at the rear end 16 of the platform A as by welding the base portion 80 and the rear edges of the stiffening plates 84 to the channel 24.

An additional gas cylinder carrier J is shown mounted to the platform A. Corresponding parts of carrier J have been identified by the same numerals as carrier G. The two carriers differ by having their hooks and brackets 86 and 90, and 88 and 92, reversely positioned so that the brackets 90 and 92 will be on the outside of the platform.

An adjustable flexible strap is shown at K in FIG. 1 for gas cylinder carrier J. The adjustable strap K is shown in the form of a link chain and it will be appreciated that other forms of flexible strapping material may be used. One link of the chain is positioned on each of hooks 86 and 88, and extended around a gas cylinder supported on the horizontal support portion 78. A threaded bolt member 106 attached to the other end of each chain is extended through the hole in each bracket 90 and 92. A nut shown at 108 is threaded on the elongated threaded shank of the eye bolt for adjusting the length of the chain K. Conventionally gas cylinders may vary in diameter by as much as ⅜ inch, and the adjustment of the flexible strap K insures secure holding of the cylinder against the upright portion of the carrier. The adjustable strap devices K are used with each pair of hooks and brackets for each gas cylinder carrier. The diverging nature of leg portions 82 also accomodates cylinders of different diameters. The support portion 78 is located approximately two inches above the surface on which the platform A is supported so that a gas cylinder can be tilted to place a bottom edge portion on support portion 78, and then tilted upright and pushed fully onto support portion 78.

FIGS. 8 and 9 show an upright member or post M which is simply a hollow rectangular member like posts E. L-shaped brackets 112 and 114 are welded to one side of post M. The post M may be secured to the platform A in the absence of any gas cylinder carriers such as G or J. The post M can be secured to either a side 12 or to the channel 24 at the rear end 16.

With the support and transport platform of the present invention, a dealer need stock only a number of platforms A having front manipulating posts E secured thereto. As different customers come to the dealer desiring platforms for stick welders or mig welders, the dealer will simply weld a post M of FIGS. 8 and 9 to the basic platform for a stick welder unit, or a gas cylinder carrier for a mig welder. The platform for a stick welder or a mig welder has at least three upright members secured to the periphery thereof in spaced-apart relationship, and each upright member has cable storage means associated therewith. This provides separate storage for each of the power input cable, the electrode cable and the ground cable. If a customer desires a platform for a mig welder, the dealer takes the basic platform and welds a gas cylinder carrier thereto. The dealer would also weld a cable storage means H to the gas cylinder carrier. If a customer wanted additional gas cylinder carrying capacity immediately, or at a later time, the dealer can simply stock additional carriers and weld them to the platform as necessary.

The support and transport platform for welding units constructed in accordance with the present invention enables a dealer to construct a platform which will suit the particular needs of a customer while maintaining a relatively low inventory of platforms and accessories.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A generally rectangular wheeled support and transport platform for electric welders or the like, said platform having front and rear ends and opposite sides and an upper surface for supporting a welder power unit thereon, adjustable holding means on said platform extending above said upper surface for holding a welder power unit against sliding movement relative to said upper surface, said adjustable holding means being adjustable in a first direction across said opposite sides and in a second direction across said front and rear ends and includes a plurality of spaced-apart slots through said platform and being elongated in said first direction, a plurality of generally L-shaped holding members having first legs positioned against said upper surface and second legs extending upwardly therefrom, and releasable clamping means extending through said first legs and said slots for releasably clamping said holding members against movement relative to said platform.

2. The platform of clam 1 wherein said adjustable holding means includes holding brackets adjustably movable along said second legs of said holding members, and releasable securing means for securing said holding brackets against movement along said second legs.

3. The platform of claim 1 wherein said adjustable holding means includes at least two elongated slots extending inwardly from each of said opposite sides and being spaced-apart in said second direction, a generally L-shaped elongated angle iron extending across each said pair of slots generally parallel to said opposite sides and having a first leg positioned against said upper surface and a second leg extending upwardly therefrom, said first leg extending outwardly from said second leg toward one of said opposite sides, and releasable clamping means extending through said first leg and said slots for releasably clamping each angle iron against movement relative to said platform.

4. The platform of claim 3 wherein said adjustable holding means includes holding carried by said second legs of said angle irons for adjustable movement therealong, and releasable securing means for releasably securing said bracket against movement along said second legs.

5. The platform of claim 1 wherein said front end intersects said opposite sides at opposite front corners, and an upright front post secured to said platform adjacent each said front corner, each said front post having electrical cable storage means thereon for storing electrical cables.

6. The platform of claim 5 wherein said front posts are secured to said front end and said cable storage means comprises a pair of vertically-spaced cable winding brackets on each said post including an upper winding bracket opening upwardly and a lower winding bracket opening downwardly, said winding brackets extending outwardly from said posts away from said platform in said second direction.

7. The platform of claim 5 including a third upright member secured to said platform generally opposite from said front posts, and said third upright member having electrical cable storage means thereon.

8. The platform of claim 1 wherein said front and rear ends and said opposite sides define the outer periphery of said platform, and at least three spaced-apart upright members extending upwardly from said periphery, each said upright member having electrical cable storage means thereon for storing electrical cables.

9. The platform of claim 8 wherein one of said upright members is secured to said rear end and comprises a gas cylinder carrier having a generally horizontal cylinder bottom support extending away from said platform and spaced substantially below said upper surface of said platform.

10. The platform of claim 9 wherein said gas cylinder carrier includes an upright outwardly facing gas cylinder supporting portion, and adjustable strap means for firmly strapping a gas cylinder against said cylinder supporting portion.

11. The platform of claim 10 wherein said adjustable strap means includes a generally flexible strap secured at one end to one side of said cylinder supporting portion and having a threaded opposite end extendable through an opening on the opposite side of said cylinder supporting portion for receiving a nut.

12. A generally rectangular wheeled support and transport platform for electric welders or the like, said platform having front and rear ends and opposite sides and an upper surface for supporting a welder power unit thereon, adjustable holding means on said platform extending above said upper surface for holding a welder power unit against sliding movement relative to said upper surface, said adjustable holding means being adjustable in a first direction across said opposite sides and in a second direction across said front and rear ends and includes at least two elongated slots extending inwardly from each of said opposite sides and being spaced-apart in said second direction, a generally L-shaped elongated angle iron extending across each said pair of slots generally parallel to said opposite sides and having a first leg positoned against said upper surface and a second leg extending upwardly therefrom, said first leg extending outwardly from said second leg toward one of said opposite sides, and releasable clamping means extending through said first leg and said slots for releasably clamping each angle iron against movement relative to said platform.

* * * * *